Figure 1:
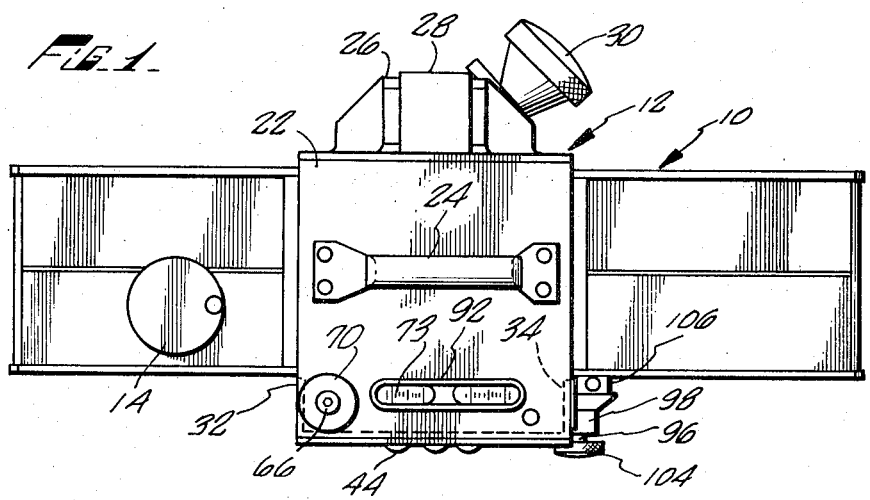

United States Patent
Myeress

[11] 3,864,837
[45] Feb. 11, 1975

[54] MOUNTING ASSEMBLY FOR A LIGHT BEAM GENERATOR

[75] Inventor: Rudolph S. Myeress, Richmond Heights, Ohio

[73] Assignee: Allied Steel & Tractor Products, Incorporated, Cleveland, Ohio

[22] Filed: Nov. 1, 1973

[21] Appl. No.: 411,750

[52] U.S. Cl. .................... 33/299, 33/227, 356/138
[51] Int. Cl. ............................................. G01c 15/00
[58] Field of Search ............ 33/227, 299, 290, 292, 33/293; 356/138, 153

[56] References Cited
UNITED STATES PATENTS

| | | | |
|---|---|---|---|
| 3,279,070 | 10/1966 | Blount et al. | 33/275 |
| 3,488,854 | 1/1970 | Trice | 33/286 |

*Primary Examiner*—Samuel B. Rothberg
*Assistant Examiner*—Charles E. Phillips
*Attorney, Agent, or Firm*—Lyon & Lyon

[57] ABSTRACT

An orientation sensing, mounting assembly for a light beam generator which is capable of accurately biasing the light beam generator relative to the mounting assembly. The biasing means allows the light beam generator to be used at a positive or negative elevation without requiring the recalibration or reorientation of the remaining portions of the mounting assembly. The mounting assembly includes a support shroud which may be rigidly attached to a standard, calibrated surveying rod. This shroud operates to enclose the mounting assembly and provides a pivot axis of the light beam generator. An orientation reference plate is mounted to the pivot axis of the shroud and is incorporated with a level for the establishment of a true horizontal reference. Associated with the orientation reference plate is an index set pin for cooperating with an index plate located on the light beam generator. This index system allows the establishment of a plurality of angular relationships between the orientation reference plate and the light beam generator. Conventional light beam generators which may be incorporated with the present system include limited elevation adjustment. The present system is designed to expand this limited elevation adjustment capability three fold.

14 Claims, 6 Drawing Figures

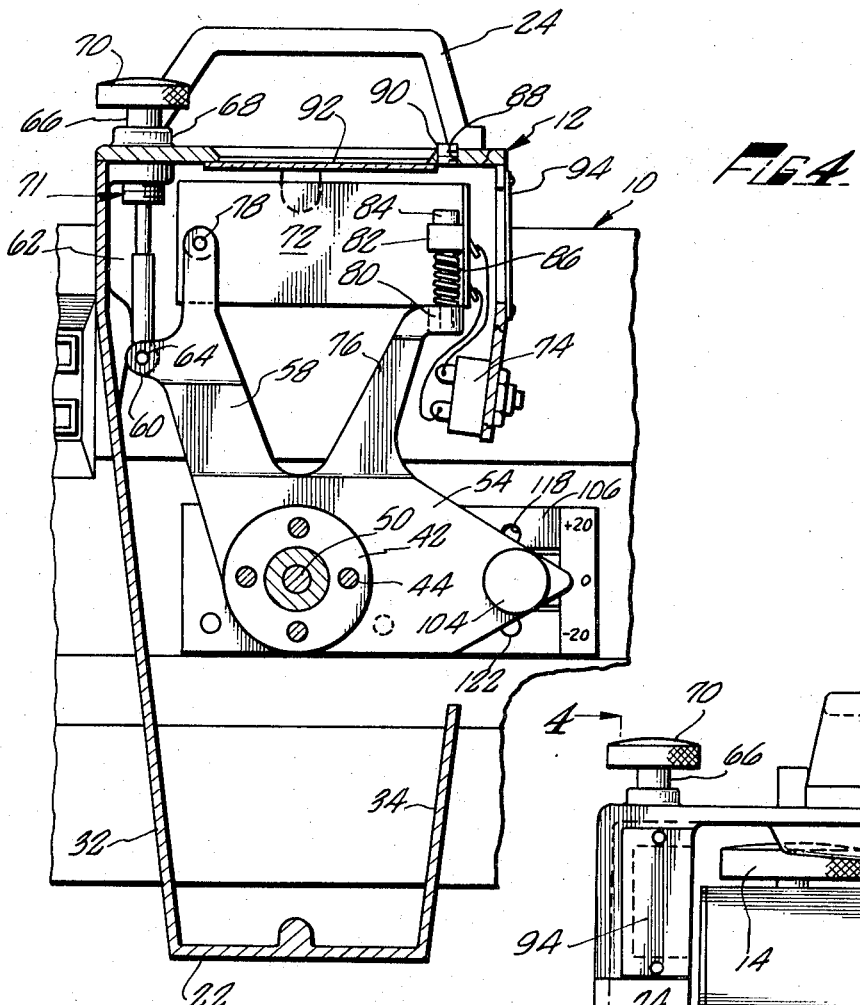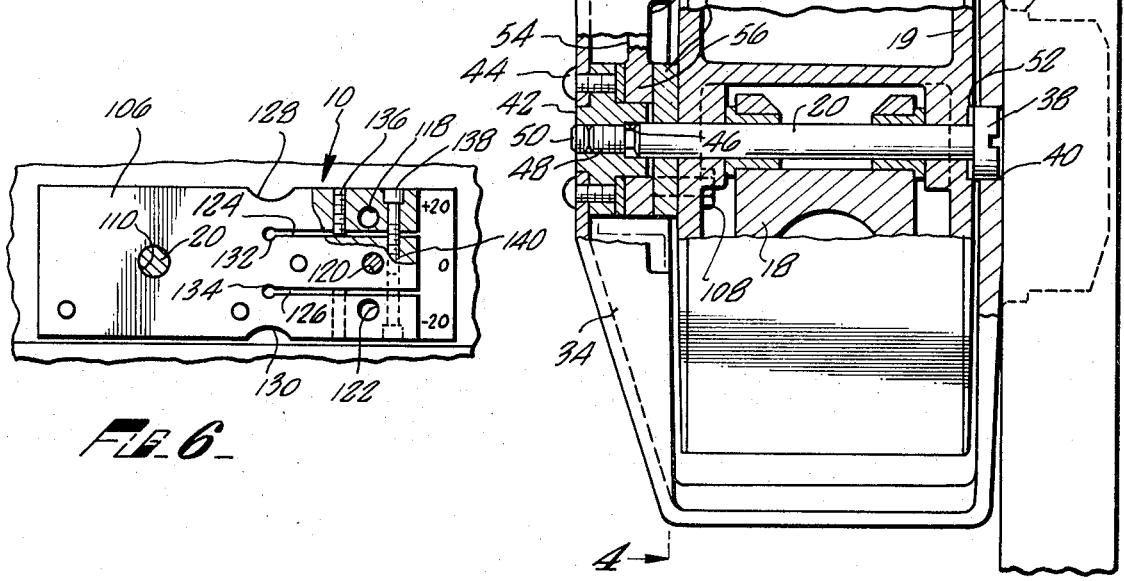

MOUNTING ASSEMBLY FOR A LIGHT BEAM GENERATOR

The present invention is directed to a mounting assembly for supporting a light beam generator on a standard surveying rod used for construction measurements. More specifically, this invention is directed to a mounting assembly for a variable elevation light beam generator which establishes true level orientation reference and expands the range of selectible elevations which the light beam generator may define.

Light beam generators are available which provide a beam of light that may be used as a reference line during construction such as the construction of a water supply or sewage pipe system. Such generators often incorporate a system built into the generator for varying the elevation of the light beam. These variations are normally accomplished by a continuous adjustment system which provides a range of ± 10 percent in precise instruments. Naturally, the entire assembly may be tipped. However, the operative nature of such variable elevation light beam generators is to provide an accurate reference line for construction measurement. Such extreme orientation of the light beam generator equipment and mounting structure would, therefore, defeat the functional purpose of the system. As a result of these limitations, it was sometimes necessary to resort to conventional surveying techniques as a means for accurately establishing reference positions. With the advent of commercial laser equipment, light beam measurement techniques are being used in a widening range of applications. Consequently, there is developing a great need for more flexible orientation and measurement equipment employing accurate light beam measurement techniques.

The present invention constitutes a mounting structure for a variable elevation light beam generator which provides for the maintenance of a level orientation reference while allowing a substantial range of light beam elevations through the biasing of the light beam generator relative to the orientation reference. The orientation reference is established in an orientation reference member which incorporates an orientation sensing means such as a level. The level is adjustable for calibrating the entire assembly. A support structure pivotally suspends the remainder of the assembly on a standard, calibrated surveying rod and is adjustably fixed relative to the orientation reference to accommodate any misalignment of the support. An indexing system establishes the angular relationship between the light beam generator and the orientation reference. This indexing system allows selected biasing between the generator and the reference. The present embodiment discloses a total elevation biasing system of ± 30 percent grade. Thus, an extremely flexible mounting assembly for a light beam generator is provided by the present invention. Further, this flexible system incorporates an orientation reference that does not require recalibration or reorientation during the operation of the unit even though a plurality of elevations may be employed.

Accordingly, it is an object of the present invention to develop a mounting assembly for a light beam generator which provides means for establishing an orientation reference that may be used with a wide range of beam elevations.

It is another object of the present invention to provide a means for establishing a fixed orientation reference for a variable elevation light beam generator which allows calibrated biasing of the light beam.

It is a further object of the present invention to provide a mounting assembly for a variable elevation light beam generator which triples the capability of the generator to provide a range of calibrated elevations.

It is yet another object of the present invention to provide a mounting assembly for a light beam generator which positions the light beam generator and allows angular biasing of the light beam generator about an axis coincident with the axis about which the elevation of the light beam is determined.

Other and more detailed objects and advantages of the present invention will appear hereinafter.

Figure 2:
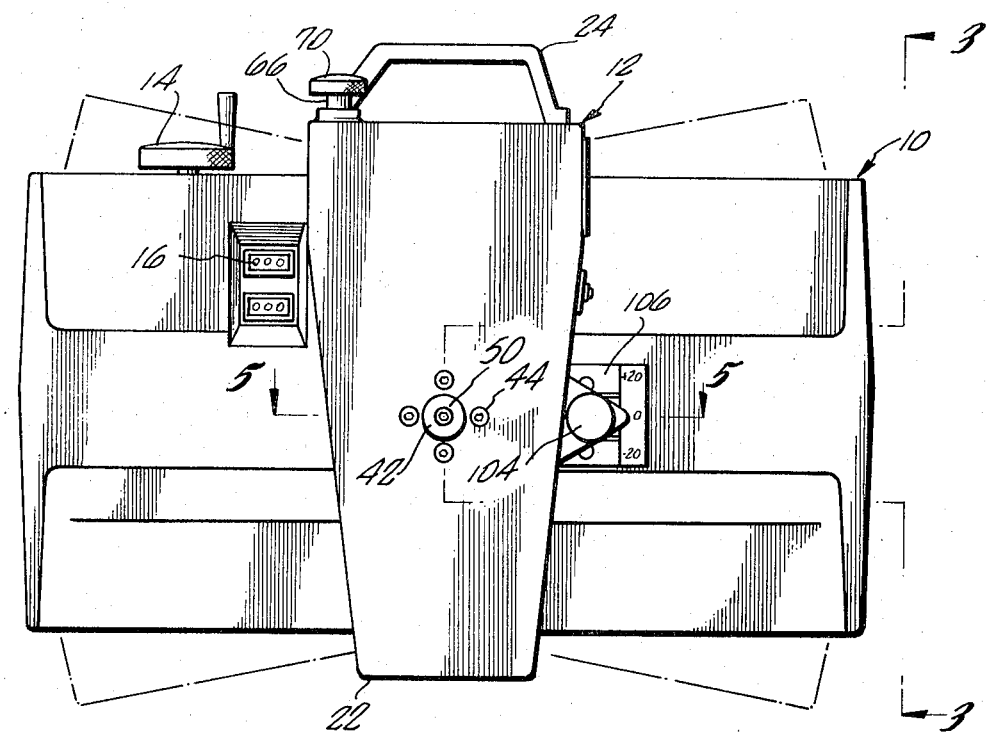
Figure 5:
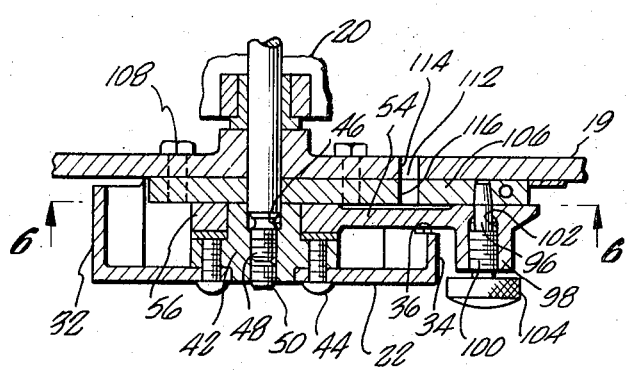

FIG. 1 is a top view of the present invention.
FIG. 2 is a side view of the present invention.
FIG. 3 is a cross-sectional end view of the present invention taken along line 3—3 of FIG. 2.
FIG. 4 is a fragmentary cross-sectional side view taken along line 4—4 of FIG. 3.
FIG. 5 is a fragmentary plan view of the present invention taken along line 5—5 of FIG. 2.
FIG. 6 is a cross-sectional elevation of the present invention taken along line 6—6 of FIG. 5.

Turning in detail to the drawings, specifically FIGS. 1 and 2, a variable elevation light beam generator and its housing 10 is illustrated. The beam generator is positioned within a mounting assembly, generally designated 12. The light beam generator 10 includes an elevation adjustment knob 14 and an elevation readout 16. In the present embodiment, the light beam is directed from the left side of the light beam generator 10 as viewed in FIG. 2. The light beam generator 10 is intended to represent any one of several laser beam generators presently available. The laser generating mechanism 18 is partially shown in FIG. 3 encased in a housing 19. The mechanism 18 is intended to be pivotally mounted about an axis defined by saddle bolt 20. The orientation of the laser generating mechanism 18 relative to the light beam generator housing 10 is controlled by the elevation adjustment knob 14 and its attendent mechanism and is indicated by the elevation readout 16. In the present embodiment, the light beam generator 10 is considered capable of a ± 10 percent elevation adjustment range. Wider ranges may also be available and the mounting assembly may be adjusted accordingly as will hereinafter be described.

The mounting assembly, generally designated 12 includes a shroud or support structure 22 which is in this embodiment cast metal. The shroud 22 extends on four sides about the center portion of the variable elevation light beam generator 10. Sufficient clearance is maintained for the relative angular positioning of the light beam generator 10 within the shroud 22. A handle 24 is positioned on the top of the shroud 22 for convenient carrying of the entire assembly. A conventional clamp 26 is designed to grasp a standard, calibrated surveying rod of square cross section. The clamp is tightened about the square surveying rod 28 by clamp knob 30. The three inner surfaces of the clamp 26 are smooth in order that firm, accurate location of the assembly is achieved with the surveying rod 28. On the front side of the shroud 22, the shroud extends a small distance away from the light beam generator 10 in order that the orientation equipment may be positioned therein. To further enclose the light beam generator and the related orientation equipment, the shroud extends inwardly at 32 and 34 as best seen in FIGS. 3 and 4. A notch 36 is provided for the orientation equipment which extends from the shroud 22. The shroud 22, clamp 26 and saddle bolt 20 provide a support structure in the present embodiment for pivotally supporting the light beam generator 10.

The shroud 22 pivotally supports the light beam generator housing 19 relative to the surveying rod 28 by means of the saddle bolt 20 which also pivotally supports the laser generating mechanism 18. The saddle bolt 20 includes a circular head 38 which fits snugly within a hole 40 in the housing 19. Thus, one end of the saddle bolt 20 is securely positioned relative to the shroud 22. At the other end of the saddle bolt 20, a trunnion 42 is secured to the front face of the shroud 22 by means of button head cap screws 44. Four such cap screws 44 are positioned symetrically about the center of the trunnion. The axis of the trunnion is coincident with the centerline of the hole 40 on the opposite side of the shroud 22. The shaft of the saddle bolt 20 is of sufficient length to extend into the trunnion bore 46 as best illustrated in FIGS. 3 and 5. In this manner, the second end of the saddle bolt 20 is fixed relative to the shroud 22.

The lateral position of the saddle bolt 20 is determined by the threaded end 48 of the saddle bolt 20. The saddle bolt end 48 is threaded into the trunnion 42 until the proper position is attained. The saddle bolt 20 is then retained by a set screw 50 which is tightened into the trunnion 42 against the threaded end 48 of the saddle bolt 20. The saddle bolt 20 thereby pivotally mounts the light beam generator housing 19 and the laser generating mechanism 18 relative to the shroud 22 which is in turn mounted to the standard calibrated surveying rod 28. A nylon washer 52 allows smooth movement of the light beam generator 10 relative to the stationary saddle bolt 20.

An orientation reference member 54, as best seen in FIG. 4, is also pivotally mounted about the axis defined by the saddle bolt 20. The orientation reference member 54 includes a hub 56 which is pivotally mounted on the body of the trunnion 42. The orientation reference member 54 is employed to establish a reference which can be maintained at a level position and from which the relative elevation of the light beam is determined. Thus, this orientation reference member 54 is operably attached to both the light beam generator 10 and the support shroud 22.

The orientation reference member 54 extends upwardly through arm 58 to a lug 60. An adjusting rod 62 extends downwardly to meet the lug 60. An eye (hidden by lug 60) is formed on the end of the adjusting rod 62. A shoulder screw 64 is positioned through the eye of the adjusting rod 62 and threaded into a tapped hole in the lug 60. The upper end of the adjusting rod 62 is threaded to cooperate with an adjusting stud 66. The adjusting stud 66 has a threaded interior for receiving the adjusting rod 62. The exterior of the adjusting stud 66 is also threaded through a portion of its length to cooperate with a boss 68 forming part of the shroud 22. The boss 68 has a threaded hole positioned therethrough for accommodating the adjusting stud 66. A knurled adjusting knob 70 cooperates with the adjusting stud 66 to vertically adjust the position of the adjusting rod 62 relative to the shroud 22.

By operating the adjustment knob 70, the adjusting stud 66 will move along its length relative to the shroud 22. At the same time, the adjusting rod 62 is moving relative to the adjusting stud 66. If the pitch of both the exterior threads and the interior threads on the adjusting stud 66 are identical, the net result obtained from twisting the adjusting knob 70 is that the adjusting rod 62 will remain stationary relative to the shroud 22. On the other hand, if the threads are reversed, the adjustment rod 62 will experience twice the travel experienced by the adjusting stud 66. Consequently, a range of sensitivities is available which is determined by the relationship between the exterior and interior threads on the adjusting stud 66.

Thus, the adjusting stud 66 and the adjusting rod 62 cooperate to provide an orientation reference adjustment system generally designated 71 which may be operated to adjust the angular relationship between the orientation reference member 54 and the shroud 22. Further, the orientation reference adjustment system 71 acts to retain the angular relationship established between the orientation reference member 54 and the shroud 22. When the standard, calibrated surveying rod 28 is positioned, it may not be possible to establish the rod in a truly vertical position. Further, the attachment between the shroud 22 and the surveying rod 28 may not, in all instances, provide true alignment therebetween. Consequently, the orientation reference adjustment system 71 may be employed to alter the orientation reference member 54 so that it will reflect a true level reference regardless of the orientation of the shroud 22 and surveying rod 28.

An orientation sensing means is located on the orientation reference member 54 in order that the member 54 will establish a true level reference. Such an orientation sensing means may include a lighted level vial assembly 72. The lighted level vial assembly 72 includes a level vial 73, shown in FIG. 1, extending across the top of the vial assembly 72, a light (not shown) beneath the level vial and a battery (also not shown). The light may be actuated by a push buttom switch 74 accessible to the exterior of the shroud 22. The lighting feature on the level vial assembly 72 is conveniently employed because the light beam generator system is often used in dimly lighted areas such as excavations.

The level vial assembly 72 is adjustably fixed relative to the orientation reference member 54 by means of arm 58 and arm 76. An eye 78 is provided at the end of arm 58 through which a fastener may be employed to pivotally attach the vial assembly 72. Arm 76 extends upwardly to an interiorly threaded lug 80 providing an attachment means which is substantially perpendicular to the pivot axis of the level vial assembly 72 through attachment eye 78. The attachment means provided by the lug 80 is also perpendicular, as is the axis through the attachment eye 78, to the centerline of the level 73.

An adjustable mount is provided for the attachment of the level assembly 72 to the lug 80. This adjustable mount incorporates in the present embodiment a collar 82 through which a socket cap screw 84 is positioned. The socket cap screw 84 engages the interiorly threaded lug 80. A biasing spring 86 is placed in compression by the socket cap screw 84 between the collar 82 and the lug 80. The socket cap screw 84 and the biasing spring 86 therefore cooperate to establish the angular position of the level assembly 72 relative to the orientation reference member 54. To recalibrate the orientation reference, an access hole 88 extends through the shroud 22. A pipe plug 90 may be employed to close the access hole 88 during normal operation. A vial sight window 92 is also provided through the top of the shroud 22 for convenient viewing of the level 73. The lighted level vial assembly 72 may also be reached through hatch 94 for replacement of batteries and the like.

The adjustable mount provided for the light level vial assembly 72 provides for the calibration of the orientation reference member 54. In order that the orientation reference member might provide a level orientation reference, it is necessary that the level vial 73 indicates a level position when the remaining adjustments indicate zero percent grade. Calibration may be accomplished by adjusting the socket cap screw 84 with the remaining adjustments registering zero percent grade to a position where the level vial 73 indicates level orientation. Thus, the present mounting assembly may operate to calibrate both the mounting assembly itself and the light beam generator. It will be seen, that once this calibration is established, and once the orientation reference member 54 is positioned in a level orientation reference by the orientation reference adjustment system 71, no further reference adjustments are necessary even though a wide range of elevations are successively employed at the same rod station.

An accurate biasing means is also provided which may be incorporated to establish any one of a plurality of fixed selectible angular relationships between the orientation reference member 54 and the light beam generator 10. Such a biasing means may include an extension of the orientation reference member 54 to accommodate a bias set pin 96 as best seen in FIG. 5. The orientation reference member 54 terminates in a boss 98 for receiving the bias set pin 96. The bias set pin 96 includes a threaded shank 100 for cooperating with a threaded bore 102 in the boss 98. The bias set pin 96 may, therefore, be moved toward and away from the light beam generator housing 19. A knurled knob 104 faciliates the actuation of the bias set pin 96.

A means for cooperating with bias set pin 96 to establish selected angular relationships between the orientation reference member 54 and the light beam generator housing 19 may be provided by a split index plate 106. The split index plate 106 is detailed in FIG. 6. The index plate 106 is secured to the light beam generator housing 19 by means of two hexagonal cap screws 108. The cap screws 108 are threaded directly into the index plate 106 as best seen in FIG. 5. Substantial tolerance is allowed in the placement of the cap screws 108 by making the holes receiving the cap screws 108 in the light beam generator housing 19 oversize. This allows the accurate placement of the split index plate 106 by means of the saddle bolt 20 extending through an accurately placed hole 110 and by means of a dowel pin 112 extending through accurately placed holes 114 in the light beam generator housing 19 and 116 in the split index plate 106.

Three holes 118, 120, 122 are provided in the present embodiment for receiving the bias set pin 96. A greater number of holes may be provided where necessary. As previously stated, the present embodiment is described with a variable elevation light beam generator 10 capable of providing a range of light beam elevations of + or − 10 percent grade. Consequently, the three holes 118, 120 and 122 are established respectively at + 20 percent grade, + 0 percent grade and − 20 percent grade. In this way, the system might be operated as a total unit to provide a range of elevations of + or − 30 percent grade. A continuous range is provided by making the incremental elevation positions equal to the total range of the light beam generator. Naturally, the increments of the index plate may be less. In this case, the ranges would overlap.

The index plate 106 is split so that some adjustment of the holes 118, 120 and 122 relative to each other might be accomplished to accommodate variations in each light beam generating unit. The split plate in the present embodiment incorporates two slits 124 and 126 which extend from the edge of the plate to a structurally weakened cross section of the plate 106. The index plate 106 is structurally weakened by circular notches 128 and 130 and by holes 132 and 134. This structurally weakened section of the index plate 106 allows greater flexibility of the split end portion. Set screws 136 extend inwardly from either side of the index plate 106 to force against the opposite side of each of the slots 124 and 126. Socket cap screws 138 also extend inwardly from the edges of the index plate 106. The hole 140 for receiving the socket cap screws 138 is threaded only in the central portion between the two slots 124 and 126. Thus, the cap screws 138 tend to pull the several segments of the index plate 106 together. To adjust the bias set pin hole 118 relative to the bias set pin hole 120 at a greater percentage grade, the socket cap screw 138 is loosened and the set screw 136 is tightened. This will force the portion of the index plate 106 associated with the hole 118 and away from the portion associated with the hole 120. The system should then be recalibrated using the adjustable mount for the level assembly 72.

To summarize the operation of the invention as set forth in the preferred embodiment, a light beam generator 10 is assembled, preferably under shop conditions, with a mounting assembly 12. The laser may then be calibrated with respect to the orientation reference plate 54 by first establishing a zero elevation reading on the entire assembly. This is accomplished by positioning the bias set pin 96 in the center hole 120 of the index plate 106 and by setting the elevation read out 16 by means of the elevation adjustment knob 14 at zero. The entire assembly should then be oriented so that the laser beam is horizontal. The pipe plug 90 may then be removed and the adjustment screw 84 rotated until the reading on the level 73 is zero. At this point, the elevation of the light beam is calibrated relative to the level 73. This single calibration is good for the entire range of elevation with the present system.

At the construction site, the surveying rod 28 is first positioned. Because the light beam generator may be employed for a substantial length of time, the surveying rod is often supported by some base means rather than held. The light beam generator and mounting assembly are then positioned on the surveying rod 28 by means of clamp 26. With the light beam generator in place, the orientation reference adjustment system 71 including the adjustment rod 62 and the adjusting stud 66 are employed to position the orientation reference member 54 at a level reference position. Once the level is centered, the orientation reference member 54 provides a level orientation reference which does not require subsequent adjustment for each elevation setting of the unit. Once the orientation reference is established at level, the operator may select which range of elevations with which he is going to work. In the present embodiment he would select between index plate holes 118, 120 and 122. These selections are made by retracting the bias set pin 96 and manually adjusting the light beam generator relative to the shroud in order that the proper hole in the index plate 106 is selected. The bias set pin 96 is then reinserted into the index plate 106. If the light beam generator 10 has an independent elevation range of 10 percent, the + 20 percent grade hole 118 provides a total elevation range of + 10 percent grade to + 30 percent grade. If the + 0 percent grade hole 122 is selected, the range is from − 10 percent grade to + 10 percent. If the − 20 percent grade hole 122 is selected, the range is from − 10 percent grade to − 30 percent grade. Consequently, the total operation of the system allows a + or − 30 percent grade range. Once the bias set pin 96 is positioned in the appropriate hole in the index plate 106, the elevation adjustment knob 14 is employed to elevate the laser generating mechanism 18 until the proper elevation readout 16 is obtained. When a second elevation is desired, the bias set pin 96 is reset and the elevation adjustment knob 14 again finally positions the laser. At any second or subsequent elevation adjust, the orientation reference adjustment system 71 need not be further adjusted.

Thus, a light beam generator and mounting assembly is provided which is first capable of being established with a fixed level orientation reference which does not change during further manipulation of the system. With this established level orientation reference, the system may also be employed to operate across an elevation range of + or − 30 percent grade. The present invention can also provide greater ranges where desired. While embodiments and applications of this invention have been shown and described, it would be apparent to those skilled in the art that many more modifications are possible without departing from the inventive concepts herein described. The invention therefore is not to be restricted except by the spirit of the appended claims.

What is claimed is:

1. A mounting assembly for a variable elevation light beam generator said light beam generator having a housing, comprising:
   a support structure to which the light beam generator is pivotally mounted;
   an orientation reference member pivotally mounted to said support structure about an axis coincident with the pivot axis of the light beam generator, said orientation reference member being adjustably fixed relative to said support structure to define an orientation reference position;
   means mounted on said orientation reference member for sensing the orientation of said orientation reference member with respect to true level; and
   biasing means mounted partially on said orientation reference member and partially on the light beam generator housing for adjustably fixing the light beam generator relative to said orientation reference member to increase the effective range of elevations available with the variable elevation light beam generator.

2. The assembly of claim 1 wherein said orientation reference member defines a level orientation reference.

3. The assembly of claim 1 wherein said orientation sensing means includes a level.

4. The assembly of claim 1 wherein the assembly further comprises an orientation reference adjustment system extending between said support structure and said orientation reference member for adjustably fixing said orientation reference member relative to said support structure.

5. The assembly of claim 1 wherein said orientation sensing means includes an adjustable mount for mounting said orientation sensing means to said orientation reference member for adjustments in the calibration of the light beam generator and the mounting assembly.

6. The assembly of claim 1 wherein said biasing means includes fixed positions spaced in increments equal to the total elevation range of the light beam generator.

7. The assembly of claim 1 wherein said biasing means includes specific fixed increments which successively vary by 20 percent grade.

8. The assembly of claim 1 wherein said biasing means includes fixed increments which may be adjusted to represent actual percentage grade variations of the light beam.

9. The assembly of claim 1 wherein said biasing means includes a biasing set pin associated with said orientation reference member and an index plate associated with the light beam generator.

10. A light beam generator assembly comprising
    a laser generating mechanism;
    a housing for said laser generating mechanism, said laser generating mechanism being pivotally mounted relative to said housing;
    means mounted on said housing for adjustably fixing said laser generating mechanism relative to said housing;
    a support structure, said housing being pivotally mounted to said support structure;
    an orientation reference member pivotally mounted to said support structure about an axis coincident with the pivot axis of said housing relative to said support structure;
    means extending between said support structure and said orientation reference member for adjustably fixing said orientation reference member relative to said support structure;
    means on said orientation reference member for sensing the orientation of said orientation reference member relative to true level; and
    biasing means mounted partially on said orientation reference member and partially on said housing for establishing any one of a plurality of selective angular relationships between said orientation reference member and said housing.

11. The assembly of claim 10 wherein said orientation sensing means includes an adjustable mount for mounting said orientation sensing means to said orientation reference member for adjustments in the calibration of the light beam generator and the mounting assembly.

12. The assembly of claim 10 wherein said means for establishing angular relationships between said orientation reference member and said housing includes specific selectable angular relationships defining incremental changes in the elevation of the laser beam equal to the total elevation range of the laser generating equipment relative to said housing.

13. The assembly of claim 10 wherein said means for establishing selectible angular relationships between said orientation reference member and the housing include a set pin associated with said orientation reference member and an index plate associated with said housing for receiving said set pin.

14. A mounting assembly for a variable elevation light beam generator, comprising:
- a support structure for pivotally mounting the light beam generator about a horizontal axis, said support structure being capable of attachment to a surveying rod;
- an orientation reference member pivotally mounted to said support structure about an axis coincident with the pivot axis of the light beam generator relative to said support structure;
- means extending between said orientation reference member and said support structure for adjustably fixing said orientation reference member relative to said support structure to establish a level orientation reference position;
- level means positioned on said orientation reference member for sensing the orientation of said orientation reference member, said level means including an adjustable mount for mounting said orientation sensing means to said orientation reference member, said adjustable mount allowing calibration of the light beam generator relative to true level; and
- biasing means mounted partially on said orientation reference member and partially on said light beam generator for fixing the light beam generator relative to said orientation reference member to increase the effective range of elevations available with the variable elevation light beam generator, said biasing means including a bias set pin associated with said orientation reference member and an index plate associated with the light beam generator, said bias set pin being positionable in any one of a plurality of index points on said index plate.

* * * * *